Sept. 1, 1959 L. G. BURGESS ET AL 2,902,109
SILENCER FOR PULSATING GASEOUS CURRENTS
Filed Aug. 5, 1953 2 Sheets-Sheet 1
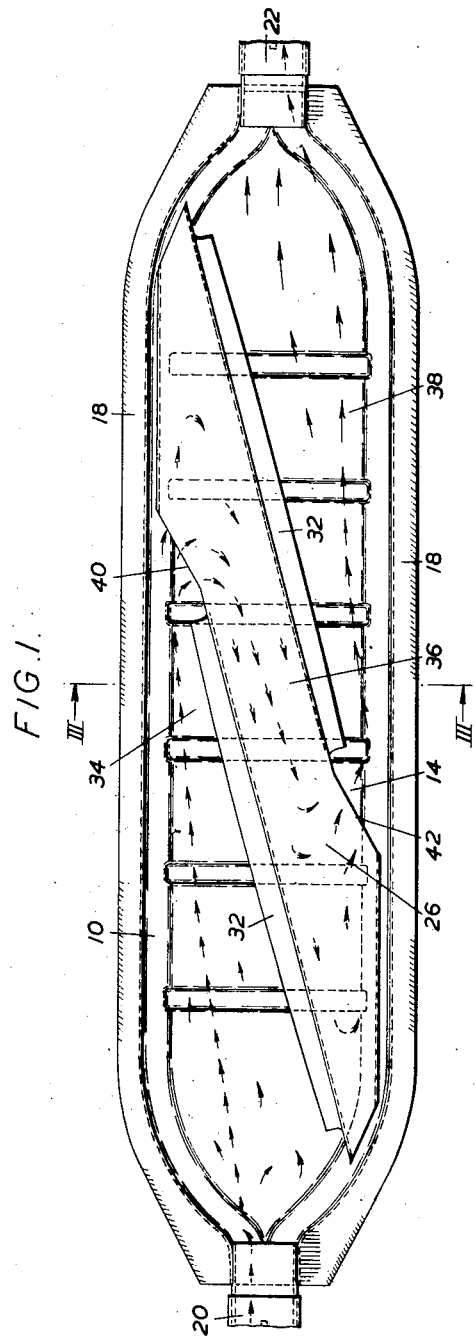
Inventors
Leslie G. Burgess &
William H. Gee
By
Attorney Sept. 1, 1959 L. G. BURGESS ET AL 2,902,109
SILENCER FOR PULSATING GASEOUS CURRENTS
Filed Aug. 5, 1953 2 Sheets-Sheet 2
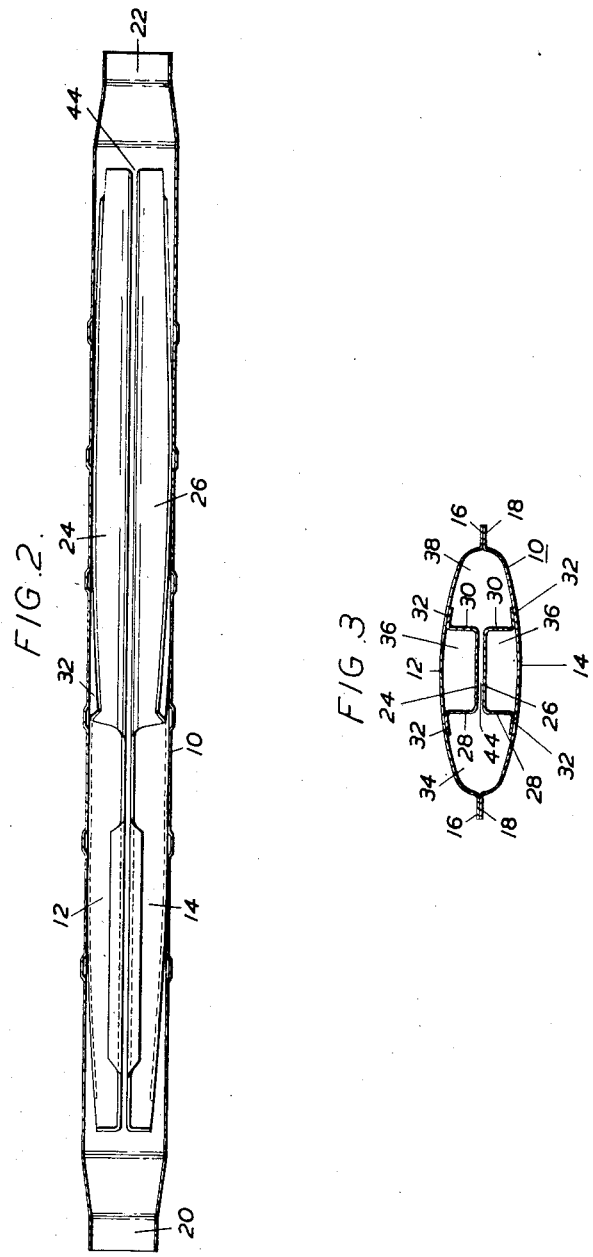
Inventors
Leslie G. Burgess &
William H. Gee
By
J. C. Jones
Attorney

ID=2,902,109

SILENCER FOR PULSATING GASEOUS CURRENTS

Leslie G. Burgess, Totternhoe, and William H. Gee, Luton, England, assignors to General Motors Corporation, Detroit, Mich., a corporation of Delaware Application August 5, 1953, Serial No. 372,485

Claims priority, application Great Britain August 27, 1952

4 Claims. (Cl. 181—53)

This invention relates to silencers for pulsating gaseous currents for use on internal combustion engines, pumps and compressors, and the like.

Such silencers are often in the form of a metal casing containing one or more baffles.

For some purposes it is convenient to have a silencer which is comparatively thin in one dimension.

The principal object of this invention lies in a method of making a silencer which is formed of sheet metal pressings so shaped that the silencer is comparatively thin in one dimension.

This object is achieved by a method consisting of making a silencer by forming two sheet metal pressings to the same shape to form two halves of a casing, forming two other sheet metal pressings to similar but reverse shapes to form baffles, securing the baffles respectively to the two halves of the casing, and then uniting the two halves of the casing.

The silencer of this invention comprises a tube formed of two similar sheet metal pressings of elongated elliptical cross-section having hollow diagonal partitions therein having apertures adjacent ends thereof so that the gaseous flow is twice reversed.

The silencer preferably comprises a tube of elongated elliptical cross-section formed of upper and lower sheet metal pressings and a pair of parallel and diagonally located sheet metal pressings each of U-section and each attached respectively to a tubular pressing to form therein a pair of diagonal passages connected adjacent the ends thereof to longitudinal passages within the tube.

The tubular pressings and the partitions or U-section pressings are preferably flanged to facilitate the attachment of the pressings one to the other and of the partitions to the pressings.

The advantages of the invention and the preferred manner in which the objects and advantages thereof are realised will be apparent to those skilled in the art from the appended description of the preferred embodiment of the invention and the accompanying drawings in which:

Fig. 1 is a plan view of a silencer, with one half of the silencer tube removed to show the internal construction;

Fig. 2 is a longitudinal section through the silencer shown by Fig. 1 and showing the partitions in side elevation; and Fig. 3 is a section on line III—III of Fig. 1.

The exhaust gas silencer for a motor vehicle, shown in the drawings, consists of a tube 10 of flattened oval cross-section formed of two similar sheet metal pressings 12 and 14 united along their flanged juxtaposed edges 16 and 18 respectively as by spot welding, and open at its ends to form an inlet 20 and an outlet 22. Each pressing 12 and 14 forms half of the tube 10 which contains a pair of diagonally located and oppositely formed hollow sheet metal pressings 24 and 26, each of U-section and each fixed, as by spot welding to one of the pressings 12 and 14 forming the tube 10. The side walls 28 and 30 of the U-section pressings have flanges 32 by which the pressings are secured to the tube 10 to form partitions or baffles 24 and 26. The pressings may be deformed to provide the transverse ribs shown by Figs. 1 and 2.

Each U-section pressing 24 and 26 divides its associated half of the tube 10 into three interconnected channels 34, 36, 38 respectively substantially longitudinal, diagonal and longitudinal, the connection between adjacent channels being by one aperture 40, 42 respectively in each wall 28 and 30 near the end of each U-section pressing 24 and 26. There is a shallow space 44 which is small relative to the depth of the pressings 24 and 26 and which is between the two U-section pressings 24 and 26 to allow for expansion thereof.

The exhaust gases may flow through the silencer in three streams. Two of these streams involve gases entering the silencer at 20 and flowing through the longitudinal inlet channel 34 to the apertures 40 leading to the diagonal channels 36. From the diagonal channels 36 the two streams emerge through the openings 42 and flow to the outlet 22 through the outlet channel 38. The third stream passes through the shallow space 44 between the two U-section pressings 24 and 26 directly from the inlet 20 to the outlet 22; but only a relatively small proportion of the total flow constitutes this stream in view of the shallowness of the space.

It will be apparent to those skilled in the art that many modifications of the invention can be made within the scope thereof, which is not to be construed as limited or restricted by the detailed description of the presently preferred embodiment of the invention.

What we claim is:

1. An exhaust silencer for motor vehicle engines comprising a tube formed of two similar sheet metal pressings and being elongated and of elliptical cross section, and a hollow diagonal partition spaced from one and secured to the other of said pressings, said partition being less than but almost the height of said tube and extending diagonally across substantially the entire width of said tube and having an aperture in the upstream side at the downstream end and an aperture in the downstream side at the upstream end so that the gaseous flow in said tube is twice reversed.

2. An exhaust silencer for motor vehicle engines comprising a tube formed of two similar sheet metal pressings and being elongated and of elliptical cross section, and a pair of hollow diagonal partitions therein, each of said partitions being less than but almost half the height of said tube and each extending parallel to the other diagonally across substantially the entire width of said tube and each having an aperture in the upstream side at the downstream end and an aperture in the downstream side at the upstream end, so that the gaseous flow is twice reversed, said pair of partitions being formed of two flanged and U-shaped cross section pressings each of which is spot welded along the flanges to one half of said tube.

3. An exhaust silencer for motor vehicle engines comprising a tube formed of two similar sheet metal pressings each being elongated and of semi-elliptical cross section, and a pair of hollow diagonal partitions each spaced from one and secured to the other of said pressings, said pair of partitions being less than but almost the height of said tube and each extending parallel to the other diagonally across substantially the entire width of said tube and each having an aperture in the upstream side at the downstream end and an aperture in the downstream side at the upstream end, so that the gaseous flow in said tube is twice reversed, said pressings and said partitions being flanged to facilitate the attachment of said pressings to one another and said partitions to said pressings.

4. An exhaust silencer for motor vehicle engines comprising a tube formed by a pair of sheet metal sections having depressions therein and flanges thereabout with the flanges secured together to form a chamber within said sections, a pair of flanged baffles each having a central wall and two sidewalls and having an opening in each side wall adjacent the opposite ends thereof, one of said baffles being secured diagonally in each of said pair of sections and parallel to the other of said baffles and having an opening in the upstream side wall at the downstream end and an opening in the downstream side wall at the upstream end, said baffles providing reverse flow passages in said chamber, said baffles being secured by the flanges thereof with said central walls disposed in spaced relation in said chamber to provide a narrow slot extending throughout the length of said baffles and connecting the opposite ends of said chamber, said baffles also connecting the opposite ends of said chamber through said passages in said baffles.

References Cited in the file of this patent

UNITED STATES PATENTS

| | | |
|---|---|---|
| 1,452,435 | Pullin | Apr. 17, 1923 |
| 1,688,488 | Dormeyer | Oct. 23, 1928 |
| 1,803,415 | Van Hoorn | May 5, 1931 |
| 2,016,254 | Noblitt et al. | Oct. 1, 1935 |
| 2,484,521 | May | Oct. 11, 1949 |

FOREIGN PATENTS

| | | |
|---|---|---|
| 826,288 | France | Jan. 4, 1938 |
| 632,013 | England | Nov. 15, 1949 |